United States Patent [19]

Bryan

[11] Patent Number: 4,770,589

[45] Date of Patent: Sep. 13, 1988

[54] CARGO HANDLING SYSTEM

[75] Inventor: D. Ray Bryan, Seattle, Wash.

[73] Assignee: The Boeing Company, Seattle, Wash.

[21] Appl. No.: 928,681

[22] Filed: Nov. 7, 1986

Related U.S. Application Data

[63] Continuation of Ser. No. 661,230, Oct. 15, 1984, abandoned.

[51] Int. Cl.⁴ .................. B63B 27/00; B65G 67/60
[52] U.S. Cl. .................. 414/139; 104/119;
104/165; 198/589; 220/1.5; 410/90; 414/140
[58] Field of Search ............... 220/1.5; 104/118, 119,
104/120, 165; 414/137, 139, 140; 410/90, 91;
198/589

[56] References Cited

U.S. PATENT DOCUMENTS

| | | | |
|---|---|---|---|
| 983,301 | 2/1911 | Murdock | 414/138 |
| 1,454,804 | 5/1923 | Wright | 104/119 X |
| 2,409,400 | 10/1946 | Telford | 198/681 |
| 2,424,292 | 7/1947 | Watkins et al. | 198/729 |
| 2,715,969 | 8/1955 | Olsen | 414/139 X |
| 3,083,670 | 4/1963 | Harlander et al. | 414/140 X |
| 3,462,787 | 8/1969 | Seipos | 14/71 |
| 3,468,437 | 9/1969 | Miller | 215/15 |
| 3,561,030 | 2/1971 | Seipos | 14/71 |
| 3,570,177 | 3/1971 | Tomaro | 104/118 X |
| 3,577,838 | 5/1971 | Van Marle | 14/71 |
| 3,583,327 | 6/1971 | Arndt | 104/120 |
| 3,591,023 | 7/1971 | Allen | 414/140 X |
| 3,738,302 | 6/1973 | Flajole | 410/91 X |
| 3,768,624 | 10/1973 | Kornylak | 104/165 X |
| 4,078,499 | 3/1978 | Giraud | 104/165 |
| 4,207,821 | 6/1980 | Beckert | 104/119 |
| 4,235,399 | 11/1980 | Shorey | 414/137 X |

FOREIGN PATENT DOCUMENTS

| | | | |
|---|---|---|---|
| 280862 | 3/1965 | Australia | 414/140 |
| 115881 | 9/1979 | Japan | 414/139 |

Primary Examiner—Robert J. Spar
Assistant Examiner—Janice Krizek
Attorney, Agent, or Firm—Christensen, O'Connor, Johnson & Kindness

[57] ABSTRACT

Disclosed is a cargo handling system including cargo containers (10) having recesses (68) extending through the lower central region of the containers. The containers straddle and are transported over a route that is formed by four types of conveyor modules: lateral transfer modules (16) which move cargo along a straight line path; turntable/elevator modules (20) for transfer of containers between modules that are horizontally and vertically displaced from one another; ship connector modules (26) for linking shore-bound modules to shipboard modules (28); and shipboard modules for stowage of the containers during transit on a ship.

15 Claims, 6 Drawing Sheets

CARGO HANDLING SYSTEM

This application is a continuation application based on prior copending application Ser. No. 661,230, filed 10-15-84, entitled Cargo Handling System, now abandoned.

BACKGROUND OF THE INVENTION

This invention relates to cargo handling systems, and in particular, to systems for transporting containers between a floating vessel and a cargo terminal.

In transporting cargo to and from a floating vessel, it is necessary to have a cargo handling system that is adaptable to varying loading conditions. The most significant loading conditions to be considered are the relative positions of the vessel with respect to a pier or quay and, especially in smaller craft, the relative movement of the vessel during the loading operation. Further, the cargo handling system must be capable of loading or unloading containers from ships or varying height, and to accomplish the operation while the vessel moves relative to the pier or quay.

In one type of prior art system that utilizes cargo containers, the containers are loaded and unloaded by overhead crane systems, motorized vehicles, or a combination of the two. While such systems may offer controlled ship to shore container transport, they invariably require a considerable amount of space.

A second type of prior art system employs an endless conveyor system such as a belt or chain, with the system being configured for extending the conveyor between the ship and the terminal. Although attempts have been made to arrange such a prior art system so that it satisfies the above-mentioned positioning and movement constraints, such systems have not been totally satisfactory. For example, this type of system often requires a substantial amount of manual movement of the cargo containers relative to transporting the containers between a stowed, on-board condition and a desired location within the terminal. Further, such prior art systems generally are not capable of handling relatively large cargo containers of the type currently used in commerce.

SUMMARY OF THE INVENTION

This invention provides a space-saving cargo handling system that is configured for movement of cargo containers between storage positions in a terminal and stowage locations on board a ship with little or no manual intervention. In accordance with the invention, cargo containers that have a recess that extends longitudinally along the lower central region thereof are transported between a cargo terminal and a ship by a system of conveyor modules. Four types of conveyor modules are disclosed: lateral transfer modules, which move cargo containers along a straight horizontal path; turntable/elevator modules, which facilitate the cargo container's transfer between conveyor modules that are at different elevations and/or are angularly spaced apart from one another; ship connector modules, which provide a link between the ship and on-shore conveyor modules; and, shipboard modules, which are configured for movement of the cargo containers during loading and unloading operations and for securing the cargo containers while the ship is underway. By selectively employing the four types of conveyor modules, various system arrangements can be realized.

Each type of conveyor module includes a motor-driven endless conveyor, which extends along the upper portion of a substantially rectangular base unit. During storage and unloading operations, the cargo containers straddle the conveyor modules with the endless conveyor in contact with the upper surface of the cargo container recess. In the currently preferred embodiment of the invention, rollers that project outwardly from the sidewalls of the cargo container recess contact the side panels of the conveyor modules to stabilize the cargo containers during cargo transfer and to facilitate movement along the conveyor modules. Further, a means for securing the containers for shipboard transport is provided.

DETAILED DESCRIPTION

Figure 1:
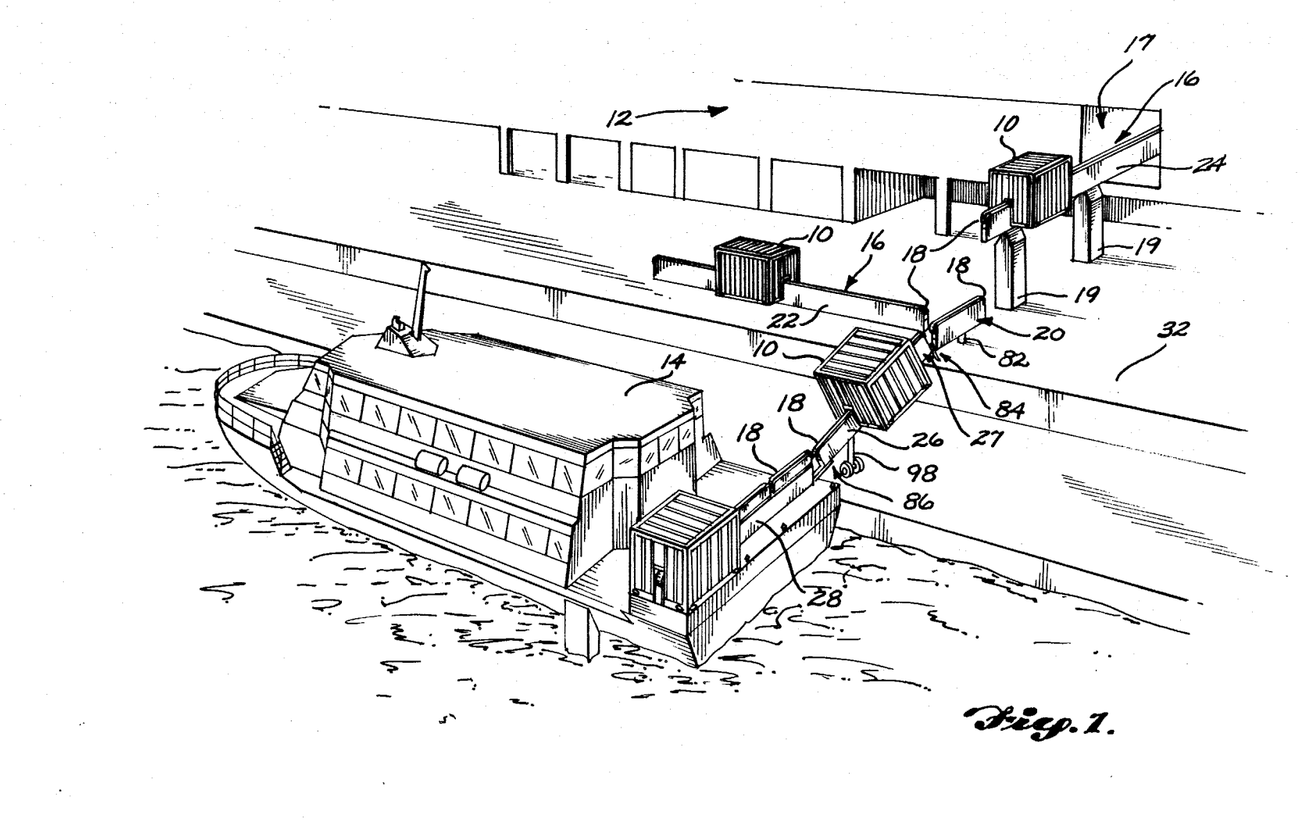
FIG. 1 depicts a cargo handling system constructed in accordance with the invention.

FIG. 1 illustrates a modular cargo handling system constructed in accordance with this invention for transporting cargo between a ship 14 and a cargo terminal 12. In the arrangement of the invention depicted in FIG. 1, ship 14 is moored alongside a floating pier 30 that extends from a quay 32. Cargo is transferred between ship 14 and terminal 12 by means of variously configured conveyor modules that are positioned on ship 14, across floating pier 30, and along the quay 32. Four types of conveyor modules are illustrated in FIG. 1: lateral transfer modules 16; a turntable/elevator module 20, a ship connector module 26; and, shipboard modules 28. As shall be recognized upon understanding the construction and operation of conveyor modules 16, 20, 26 and 28, the invention can be arranged in numerous configurations to facilitate transfer of cargo between ship 14 and terminal 12 in addition to providing storage of cargo in terminal 12 and on quay 32.

As is indicated in FIG. 1, cargo handling systems constructed in accordance with the invention employ box-like cargo containers 10 having a recess that extends longitudinally through the central, lower region of cargo container 10. As shall be described in more detail, during the cargo transfer operation, cargo containers 10 straddle the various modules 16, 20, 26 and 28 and are moved along the modules by an endless conveyor assembly 18 that is contained in the upper portion of each type of module.

Figure 2:
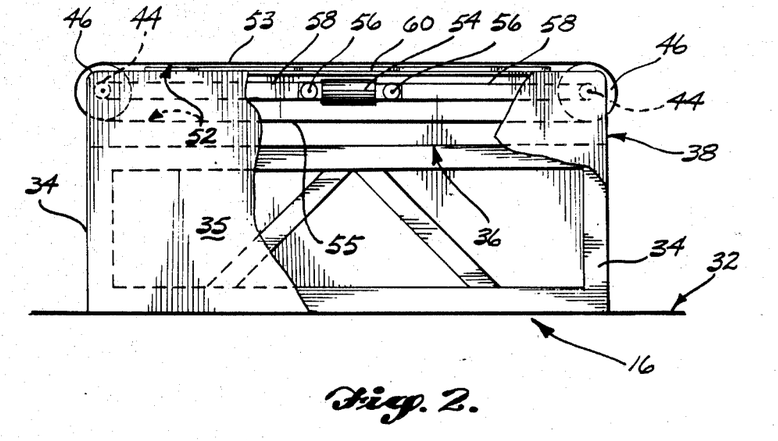
FIG. 2 is a side view of the lateral transfer conveyor module of FIG. 1.
Figure 3:
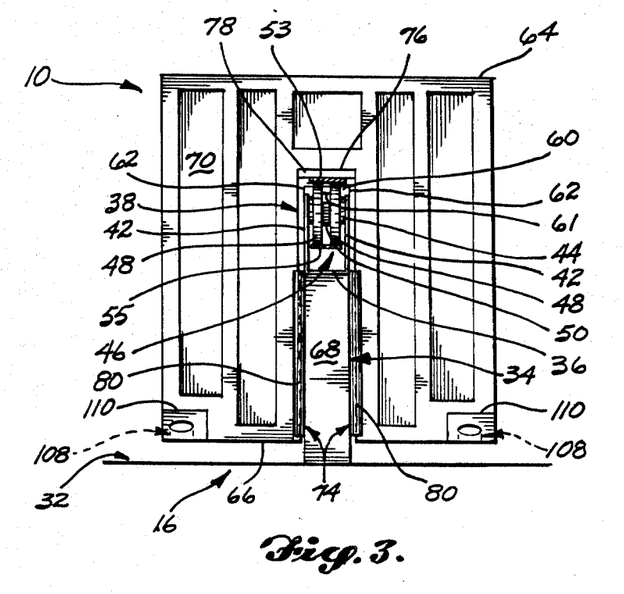
FIG. 3 is an end view of a cargo container positioned on a conveyor module constructed in accordance with the invention.

Turning now to the details of a lateral transfer module 16, reference is made to FIGS. 2 and 3. As mentioned previously, lateral transfer modules 16 are incorporated into the cargo handling system at locations where no task other than the movement of the container along a substantially horizontal line is required. Each lateral transfer module 16 comprises a base 34, which is essentially a support frame that can be formed of various suitable structural components such as welded steel members. Conveyor assembly 18 comprises a substantially U-shaped support bracket 38 that is affixed to, and extends across, the upper surface 36 of the base 34. The upwardly projecting sides 42 of the U-shaped support bracket 38 are substantially parallel and spaced apart a distance slightly less than the thickness of the base 34. A pair of spaced apart drive wheels 46 are connected between the sides 42 of the support bracket 38 at each end of the support bracket. Each pair of drive wheels 46 is mounted on an axle 44. A sprocket wheel 50, which is also affixed to the axle 44, is positioned between the two drive wheels of each pair of drive wheels 46. An endless conveyor belt 52, which has a width slightly less than the distance between the two sides 42 of support bracket 38, extends across the length of the module 16 and encompasses the outer portion of each pair of drive wheels 46. A flat cover plate 35 encloses the side portions of the lateral transfer module.

Mounted between the upper and lower surfaces (53 and 55) of the conveyor belt 52 is a reversible electric motor 54. The motor 54 has a pair of right-angle drive sprockets 56 extending from each end. Endless chains 58 extend between each drive sprocket 56 and the sprocket wheel 50 of the pair of drive wheels 46 that is closest to that particular sprocket 56. Each chain 58 engages a sprocket wheel 50 so that when motor 54 is actuated in either direction, the drive wheels 46 and the conveyor belt 52 begin to rotate. Although it is preferable to drive both pairs of drive wheels 46, a single endless chain can be employed to drive only one pair of drive wheels (i.e., with the other pair of drive wheels acting as idler wheels).

Extending between the upper edges of sides 42 of support bracket 38 is a slider plate 60. The slider plate 60 is channel-shaped, having each flange 62 removably attached to one upper edge of sides 42 of the support bracket 38. The web 61 of the slider plate is located below the upper surface 53 of conveyor belt 52 to keep the conveyor belt from sagging and to provide a surface over which the conveyor belt can slide.

Continuing with the description of the cargo handling system configuration of FIG. 1, a lateral transfer module 16 extends outwardly from an elevated doorway 17 of terminal 12, and is supported by a pair of posts 19 that extend from quay 32 to the lower surface of the lateral transfer module 16. This construction provides an elevated portion of the system 24 under which vehicle or pedestrian traffic can be accommodated.

Figure 5:
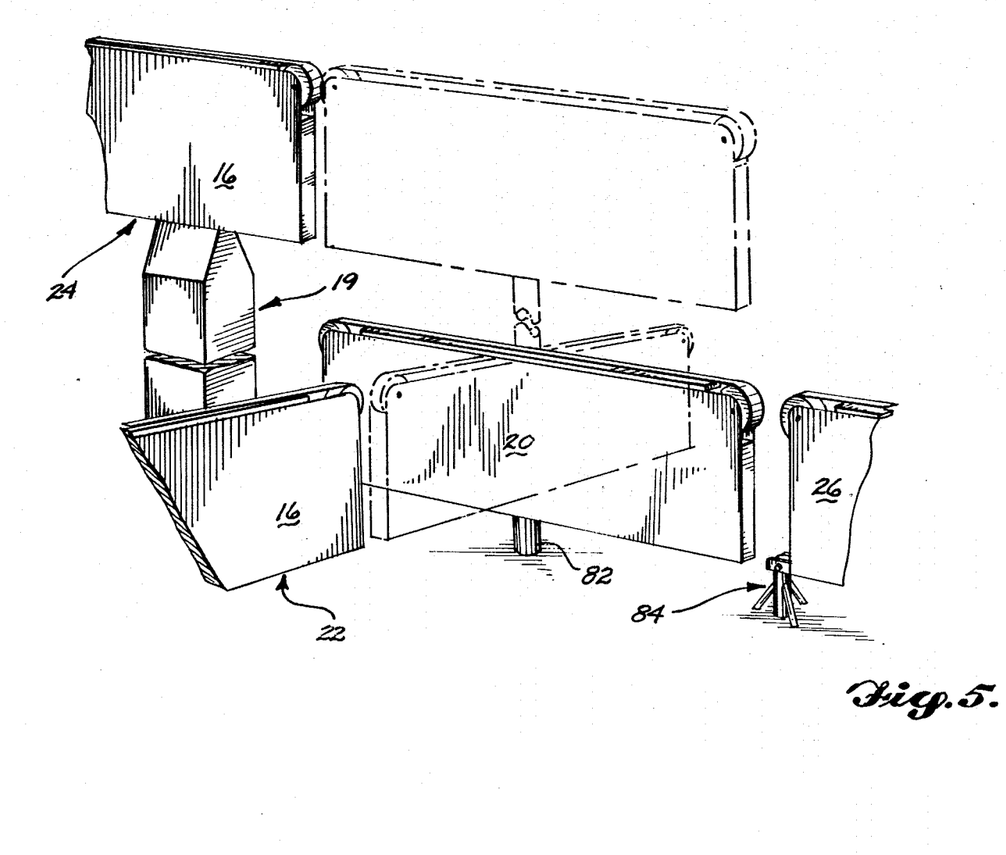
FIG. 5 is an isometric view of a turntable/elevator module constructed in accordance with this invention.

With reference to FIGS. 1 and 5, a turntable/elevator conveyor module 20 is located at the outward end of elevated lateral transfer module 16. Basically, turntable/elevator module 20 includes a lateral transfer module 16 that is mounted on a conventional lift assembly 82 such as a hydraulic or pneumatic ram assembly. When turntable/elevator module 20 is moved upwardly and aligned with the elevated lateral transfer module 16, cargo containers 10 can be transferred between these two modules. On the other hand, when turntable/elevator module 20 is lowered to the surface of quay 32, cargo containers 10 can be transferred between turntable/elevator module 20 and either ship connector module 26 or another branch of the modular system 22 that extends along (or above) quay 32. More specifically, in the depicted arrangement, turntable/elevator module 20 can be swung into alignment with ship connector module 26 or into alignment with branch 22 which is formed by a lateral transfer module 16 that extends along the surface of quay 32 at a position that is spaced apart from and substantially orthogonal to the elevated portion of the system 24. In the arrangment of FIG. 1, the lateral transfer module 16 that forms branch 22 on quay 32 serves as a cargo storage or staging area. Alternatively, such a lateral transfer module can be employed with various other modules of the invention to transport cargo containers 10 to and from various other portions of terminal 12 or quay 32.

Depending upon the selected layout for the cargo handling systems, it is possible that turntable/elevator module 20 need only incorporate one of its functions. That is, a selected system layout may require only the elevating capability of the turntable/elevator module 20 or, on the other hand, the particular layout may only require the turntable capability of the module. In any event, the same turntable/elevator module can serve both purposes with little or no modification.

In the general sense, ship connector module 26 includes a lateral transfer module 16 that is specifically adapted for connecting the terminal portion of the system with the shipboard modules 28 that are mounted to the moored ship 14 and described in detail below. The surface of floating pier 30 will, due to tidal changes, typically be at a different elevation than that of the surface of quay 32. Further, moored ships 14 may vary in size and will tend to move slightly relative to the floating pier 30 during loading operations. To accommodate these conditions, the portion of ship connector module 26 that corresponds to a lateral transfer module includes a hinged end 27 that is attached to the quay 32 and a free end 86 that is connectable to the moored ship 14. The free end 86 of the ship connector module 26 is supported by a wheeled support 98 that extends downwardly from the lower surface of the ship connector module 26. Wheels attached to the lower end of the wheeled support rest on the surface of floating pier 30 and provide horizontal movement of the ship connector module 26 along a small arc about hinge 84 which is described in more detail later. In addition, wheeled support 98 is telescopic, thereby allowing the free end 86 of the ship connector module 26 to be moved upwardly or downwardly in a vertical plane to facilitate connection with ships of varying height.

Figure 7:
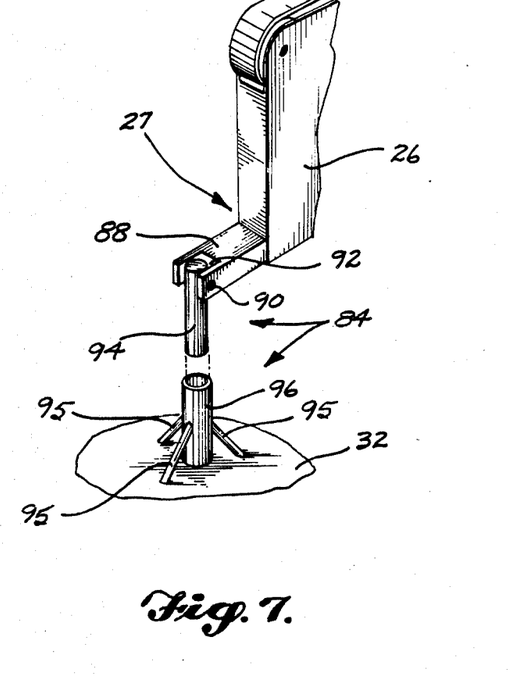
FIG. 7 is an isometric view detailing the hinge portion of a ship connector module.

As previously mentioned, the terminal end 27 of ship connector module 26 is hingedly attached to the edge of quay 32. As can be seen from FIG. 7, hinge 84 allows biaxial rotation of the ship connector module 26. Specifically, hinge 84 is formed in part by a tubular hinge element 94 that extends downwardly from terminal end 27 of ship connector 26 and is formed in part by a second tubular element 96 that extends upwardly from the surface of quay 32. In this arrangement, one end of tubular hinge element 94 is positioned in a rectangular notch 92 that is formed in the end of a rectangular bar 88 that extends outwardly from terminal end 27 of ship connector module 26. A pin 90 passes through the end of tubular element 94 and through the flange-like regions that define notch 92 to pivotably retain tubular element 94 for swinging movement about the horizontal axis. To permit swinging about the vertical axis, the lower portion of first tubular element 94 passes into the central opening of second tubular element 96, which is supported in an upright position by downwardly extending braces 95.

The above-described freedom of movement of the ship connector module 26 permits the ship connector module 26 to be properly aligned in a horizontal and vertical plane so that it can be connected to a moored ship 14. The containers 10 are thereby redirected from movement along modules located on the quay to the shipboard modules 28. In the currently preferred embodiment shown in FIG. 6, the free end 86 of the ship connector module 26 is connected to the ship by a conventional ball and socket-type hookup 93. An arm 99 is attached to the free end 86 of the ship connector module 26 and carries the socket portion of the hookup 93. Arm 99 is retractable or extendable via a jackscrew 97 so that varying gaps between the ship and the ship connector module 26 can be accommodated.

Figure 6:
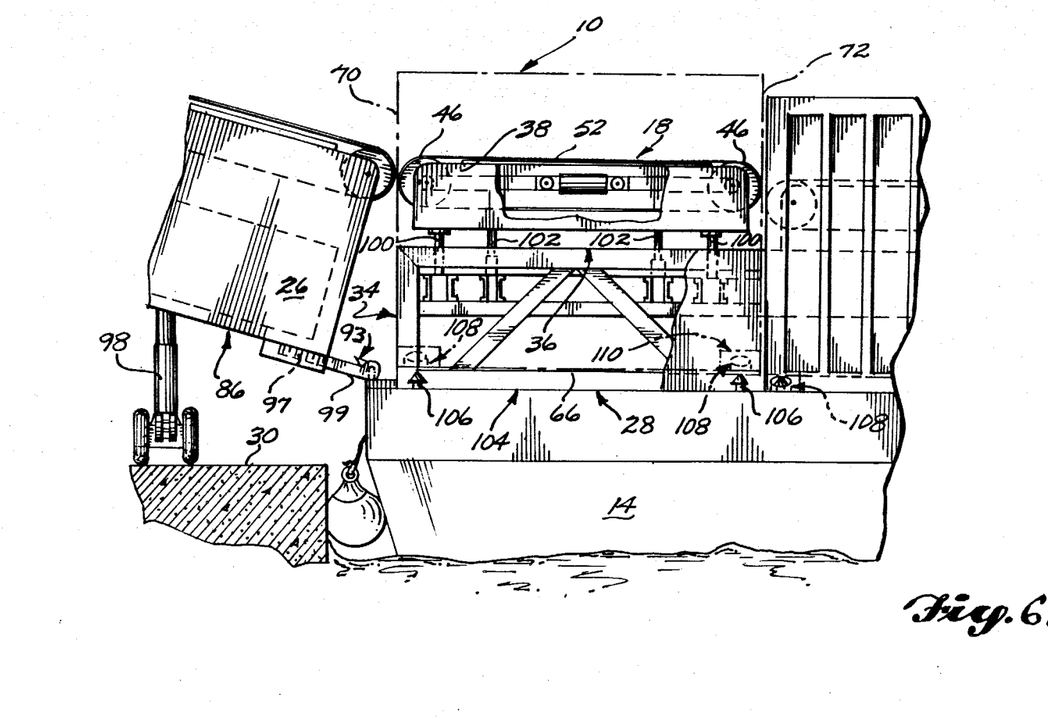
FIG. 6 is a side view of a shipboard module.

Shipboard modules 28 as shown in FIGS. 1 and 6 are incorporated into the aft structure of ship 14 in order to provide easy movement and storage of the containers on board the ship. As shown in FIG. 6, shipboard modules 28 basically include a lateral transfer module 16 having a conveyor assembly 18 that is retractably mounted to the upper portion of the shipboard modules 28. When the ship connector module 26 is properly aligned and connected to the shipboard modules 28, the cargo containers 10 can be transferred directly from the ship connector module 26 to the shipboard modules 28 or vice versa. The shipboard modules 28 are of a length approximately the same as the length of the containers 10. In a fully loaded situation each shipboard module 28 would support one container 10. When the container 10 is properly positioned upon a shipboard module 28, the conveyor assembly 18 is retracted until the containers 10 rest on their lower ends 66 on a support platform 104 that is incorporated onto the deck of the ship 14. Conventional cargo latches or tiedowns 106 are fixed to the platform 104 at positions that align with a corresponding opening 108 in corner fittings 110 located in the lower end 66 of the container at each corner thereof. The latches 106 secure the containers 10 while they are being transported by the ship 14.

As can be seen from FIG. 6, upward and downward movement of the support bracket 38 in each shipboard module 28 is provided by two synchronized electric jackscrews 100 that act on each end of the support bracket 38 near each pair of drive wheels 46. The jcakscrews 100 are mounted to the support frame of the base 34 of the shipboard module. A pair of concentric, telescoping guides 102, which are between support bracket 38 and the support frame of the base 34, ensure that support bracket 38 remains algined with base 34 as jackscrews move support bracke 38 upwardly and downwardly. In its normal operating position, support 38 and thus the entire conveyor assembly 18 is extended by jackscrews 100 away from the base 34 of the shipboard module 28. The containers 10 are then freely moved to and from the shipboard module 28 by the conveyor belt 52. Retraction of the support bracket 38 allows the containers 10 to be secured to the platform 104 of the ship as mentioned earlier.

Figure 4:
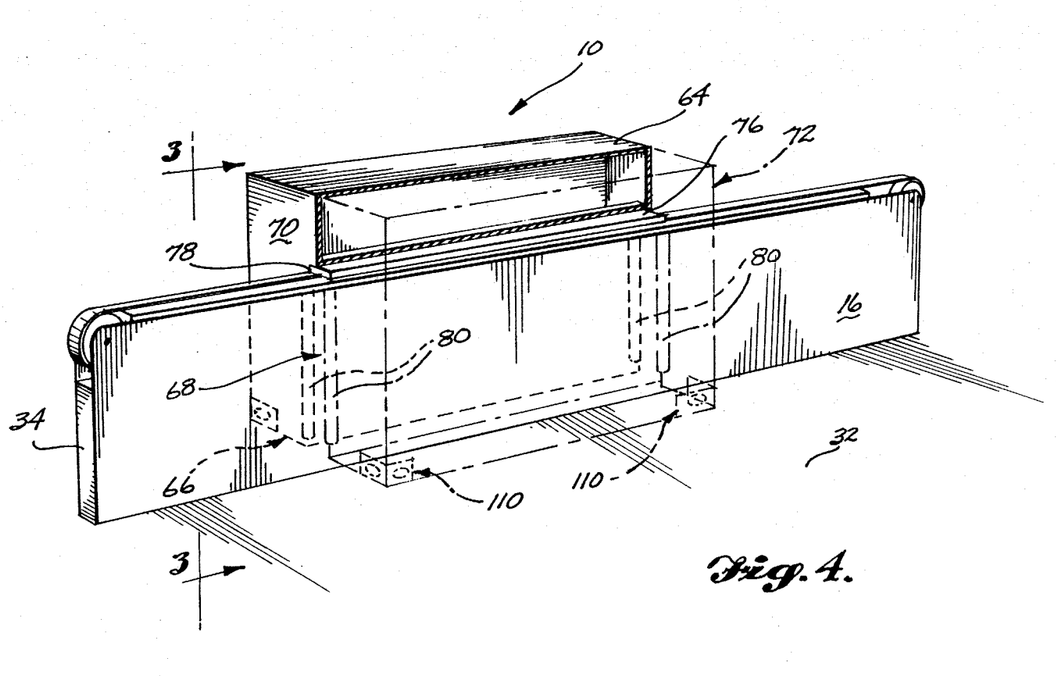
FIG. 4 is a partially cutaway, isometric view of the container and conveyor module of FIG. 3.

Turning now to the details of the cargo containers 10 constructed in accordance with this invention, FIGS. 3 and 4 show the container 10 straddling a lateral transfer module 16. Containers 10 are cuboidal shaped. A recess 68 is formed in the lower central region of the container 10 and extends from one side 70 of the container to another side 72. The recess 68 includes spaced-apart parallel sidewalls 74 and a substantially flat upper surface 76. A resilient high-friction pad 78 such as synthetic rubber is fixed to the flat surface 76 of the container 10. Two rollers 80 are mounted to the sidewall 74 on each side of the recess 68 proximal to the sides 70 and 72 of the container 10. The rollers 80 rotate about a vertical axis and project slightly outwardly from the parallel sidewalls 74 of the container into recess 68. The rollers stabilize the cargo containers and facilitate their movement along the conveyor modules.

When properly positioned on a lateral transfer module 16, the container 10 straddles the conveyor assembly 18 and the upper surface 36 of the module. Specifically, the conveyor assembly 18 and upper surface 36 of the conveyor module fit between the parallel sidewalls 74 of the recess 68 in the container 10. The resilient, high-friction pad 78 that is fixed to the flat surface 76 of the container is in contact with the upper surface 53 of the conveyor belt 52. When motor 54 is actuated the conveyor belt moves the container 10 along the lateral transfer module 16. The rollers 80 of the container 10 roll along the cover plate 35 of the lateral transfer module thereby minimizing any friction between the lateral transfer module 16 and the moving container 10.

It can be appreciated that the versatility of the above-described cargo handling system provides an efficient system that can be adapted to a wide variety of terminal, quay or ship conditions. While the invention has been described with reference to an illustrated embodiment, it is clearly understood by those skilled in the art that the invention is not limited thereto, rather the scope of the invention is to be interpreted only in conjunction with the appended claims.

The embodiments of the invention in which an exclusive property or privilege is claimed are defined as follows:

1. A cargo handling system for transporting containers between a quay and a floating vessel moored thereto, wherein the vessel is movable relative to the quay while moored thereto, each container having a lower central region provided with a recess that extends the length of the container, the system comprising:
   (a) a shipboard module mounted on the vessel deck, the shipboard module including a base, the base having a conveyor assembly mounted to its uppermost end, the base and conveyor assembly being constructed for at least partial reception in, and cooperative engagement with, the recess of each container and being operable to convey recessed containers straddling the shipboard module the length of the shipboard module unattended;
   (b) a ship connector module positioned on the quay, the ship connector module including a base, the base having a conveyor assembly mounted to its uppermost end, the base and conveyor assembly being constructed for at least partial reception in, and cooperative engagement with, the recess of each container and being operable to convey recessed containers straddling the connector module the length of the ship connector module unattended, the ship connector module having a hinged end and a free end, the hinged end including biaxial pivot means configured to permit the free end of the ship connector module to swing about both a vertical axis that passes through the hinged end and a horizontal axis that passes through the hinged end; and
   (c) connection means associated with the vessel and the free end of the ship connector module for connecting the ship connector module to the vessel to provide a continuous conveyance path for the recessed containers between the shipboard module and the ship connector module, the connection means including:
  (i) a wheel assembly connected to the free end of the ship connector module for providing support for the free end of the ship connector module, the wheel assembly being configured and arranged to provide rolling support of the free end, the wheel assembly also being extendable and retractable in the vertical direction for providing upward and downward movement of the free end;
  (ii) a ball fixedly attached to the vessel; and
  (iii) a longitudinally extendable and retractable arm connected to the free end of the ship connector module, the arm having a socket member connected thereto, the socket member being engageable with the ball.

2. The system of claim 1 wherein the containers have fittings formed in their bottoms and wherein latches that are engageable with the fittings are fastened to the vessel deck; and wherein the conveyor assemblies of the shipboard modules are upwardly extendable from the base along a substantially vertical path and downwardly retractable to the base along a substantially vertical path, the shipboard module being configured and arranged so that when the conveyor assembly is fully retracted to container bottom rests on the vessel deck with the latches engaging the fittings.

3. The system of claim 2 wherein the shipboard module includes two or more jackscrews, the jackscrews being operable to provide the upward and downward movement of the conveyor assembly.

4. The system of claim 1, wherein the recess of each container includes spaced-apart sidewalls and a substantially flat upper surface having a high friction pad attached thereto, the conveyor assembly of both the shipboard and connector modules being constructed for cooperatively engaging the high friction pad.

5. The system of claim 4, wherein the sidewalls of each container recess further include rollers that project outwardly from the sidewalls and wherein the shipboard and connector modules further comprise side panels for cooperative engagement with the rollers to stabilize each container during transfer and to reduce friction between the container's recess and the shipboard and connector modules.

6. The system of claim 5, wherein the conveyor assembly of both the shipboard and connector modules comprises:
  a reversible electric motor;
  first and second right-angle drive sprockets coupled to the motor;
  first and second belt drive rollers having spaced-apart halves;
  first and second roller sprockets positioned between the spaced-apart halves of the first and second belt drive rollers;
  a first drive chain extending between the first drive sprocket and the first roller sprocket;
  a second drive chain extending between the second drive sprocket and the second roller sprocket; and
  a conveyor belt extending between the first and second drive rollers and encompassing the motor, drive rollers, roller sprockets and drive chains.

7. A cargo handling system for transporting containers between a quay and a floating vessel moored thereto, wherein the vessel is movable relative to the quay while moored thereto, each container having a recess that extends the length of the container along the lower central region thereof, the system comprising:
  (a) a shipboard module mounted on the vessel deck, the shipboard module including a base, the base having a conveyor assembly mounted to its uppermost end, the base and conveyor assembly being constructed for at least partial reception in, and cooperative engagement with, the recess of each container and being operable to convey recessed containers straddling the shipboard module the length of the shipboard module unattended;
  (b) a ship connector module positioned on the quay, the ship connector module including a base, the base having a conveyor assembly mounted to its uppermost end, the base and conveyor assembly being constructed for at least partial reception in, and cooperative engagement with, the recess of each container and being operable to convey recessed containers straddling the connector module the length of the ship connector module unattended, the ship connector module having a hinged end and a free end, the hinged end including biaxial pivot means configured to permit the free end of the ship connector module to swing about both a vertical axis that passes through the hinged end and a horizontal axis that passes through the hinged end, the biaxial pivot means including a first tubular element attached to the quay and a second tubular element, one end of the second tubular element pivotally attached to the base of the ship connector module, the other end of the second tubular element being received within the central opening of the first tubular element.

8. A cargo handling system for transporting and securing containers upon the deck of a vessel, each container having a recess that extends the length of the container along the lower central region thereof, wherein the containers have fittings formed in their bottoms and wherein latches engageable with the fittings on the containers are fastened to the vessel deck, the system comprising:
  (a) a shipboard module mounted on the vessel deck, the shipboard module including a base, the base having a conveyor assembly mounted to its uppermost end, the base and conveyor assembly being constructed for at least partial reception in, and cooperative engagement with, the recess of each container and being operable to convey recessed containers straddling the shipboard module the length of the shipboard module unattended; and
  (b) securing means for extending the conveyor assemblies of the shipboard module upwardly and for retracting the conveyor assemblies of the shipboard module downwardly, the upward and downward movement of the conveyor assemblies occurring in a vertical path with no simultaneous movement of the conveyor assemblies along the length of the shipboard module, the securing means being configured so that when the conveyor assembly is fully retracted, the container bottom rests on the vessel deck with the latches engaging the fittings.

9. The system of claim 8 wherein the securing means includes two or more jackscrews, the jackscrews being operable to provide the upward and downward movement of the movable conveyor assembly.

10. A cargo handling system for transporting containers between a quay and a floating vessel moored thereto, wherein the vessel is movable relative to the quay while moored thereto, each container having a lower central region provided with a recess that extends the length of the container, the system comprising:
- (a) a shipboard module mounted on the vessel deck, the shipboard module including a base, the base having a conveyor assembly mounted to its uppermost end, the base and conveyor assembly being constructed for at least partial reception in, and cooperative engagement with, the recess of each container and being operable to convey recessed containers straddling the shipboard module the length of the shipboard module unattended;
- (b) a ship connector module positioned on the quay, the ship connector module including a base, the base having a conveyor assembly mounted to its uppermost end, the base and conveyor assembly being constructed for at least partial reception in, and cooperative engagement with, the recess of each container and being operable to convey recessed containers straddling the connector module the length of the ship connector module unattended, the ship connector module having a hinged end and a free end, the hinged end including biaxial pivot means configured to permit the free end of the ship connector module to swing about both a vertical axis that passes through the hinged end and a horizontal axis that passes through the hinged end; and
- (c) connection means associated with the vessel and the free end of the ship connector module for connecting the ship connector module to the vessel to provide a continuous conveyance path for the recessed containers between the shipboard module and the ship connector module.

11. The system of claim 10, wherein the recess of each container includes spaced-apart sidewalls and a substantially flat upper surface having a high friction pad attached thereto, the conveyor assembly of both the shipboard and connector modules being constructed for cooperatively engaging the high friction pad.

12. The system of claim 11, wherein the sidewalls of each container recess further include rollers that project outwardly from the sidewalls and wherein the shipboard and connector modules further comprise side panels for cooperative engagement with the rollers to stabilize each container during transfer and to reduce friction between the container's recess and the shipboard and connector modules.

13. The system of claim 12, wherein the conveyor assembly of both the shipboard and connector modules comprises:
- a reversible electric motor;
- first and second right-angle drive sprockets coupled to the motor;
- first and second belt drive rollers having spaced-apart halves;
- first and second roller sprockets positioned between the spaced-apart halves of the first and second belt drive rollers;
- a first drive chain extending between the first drive sprocket and the first roller sprocket;
- a second drive chain extending between the second drive sprocket and the second roller sprocket; and
- a conveyor belt extending between the first and second drive rollers and encompassing the motor, drive rollers, roller sprockets and drive chains.

14. The system of claim 10, wherein the sidewalls of each container recess further include rollers that project outwardly from the sidewalls and wherein the shipboard and connector modules further comprise side panels for cooperative engagement with the rollers to stabilize each container during transfer and to reduce friction between the container's recess and the shipboard and connector modules.

15. The system of claim 10, wherein the conveyor assembly of both the shipboard and connector modules comprises:
- a reversible electric motor;
- first and second right-angle drive sprockets coupled to the motor;
- first and second belt drive rollers having spaced-apart halves;
- first and second roller sprockets positioned between the spaced-apart halves of the first and second belt drive rollers;
- a first drive chain extending between the first drive sprocket and the first roller sprocket;
- a second drive chain extending between the second drive sprocket and the second roller sprocket; and
- a conveyor belt extending between the first and second drive rollers and encompassing the motor, drive rollers, roller sprockets and drive chains.

* * * * *